US008902833B2

(12) United States Patent
Govindappa et al.

(10) Patent No.: US 8,902,833 B2
(45) Date of Patent: Dec. 2, 2014

(54) SYSTEM AND METHOD FOR PERFORMING A RADIO LINK CONTROL (RLC) RESET IN A DOWNLINK MULTIPOINT SYSTEM

(75) Inventors: Sumanth Govindappa, San Diego, CA (US); Srinivasa R. Eravelli, San Diego, CA (US); William L. Atkinson, Markham (CA); Liang Zhang, San Diego, CA (US); Hailiang Cai, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 13/333,999

(22) Filed: Dec. 21, 2011

(65) Prior Publication Data
US 2012/0163315 A1 Jun. 28, 2012

Related U.S. Application Data

(60) Provisional application No. 61/426,582, filed on Dec. 23, 2010.

(51) Int. Cl.
 H04W 4/00 (2009.01)
 H04L 12/26 (2006.01)
 H04L 1/18 (2006.01)
 H04W 72/04 (2009.01)
 H04L 1/00 (2006.01)
 H04W 36/18 (2009.01)

(52) U.S. Cl.
 CPC ......... *H04L 1/1874* (2013.01); *H04W 72/0406* (2013.01); *H04L 2001/0096* (2013.01); *H04W 36/18* (2013.01)
 USPC .......................... 370/329; 370/236; 455/422.1

(58) Field of Classification Search
 None
 See application file for complete search history.

(56) References Cited

U.S. PATENT DOCUMENTS 6,839,329 B1 * 1/2005 Sato et al. .................. 370/310.1
7,646,742 B2   1/2010 Petrovic et al.
7,706,405 B2   4/2010 Terry et al.
(Continued)

FOREIGN PATENT DOCUMENTS

EP   1056258       11/2000
EP   1465369 A1   10/2004

OTHER PUBLICATIONS

3GPP TS 25.322 version 5.3.0 Release 5: Universal Mobile Telecommunications System (UMTS); Radio Link Control (RLC) protocol specification, Dec. 2002, pp. 63-66.*

(Continued)

*Primary Examiner* — Faruk Hamza
*Assistant Examiner* — Cassandra Decker

(57) ABSTRACT

A method and apparatus for wireless communication may provide an RLC reset procedure tailored for a multipoint HSDPA system utilizing a plurality of disparate Node Bs to provide an RLC flow from an RNC to a UE. Some aspects of the disclosure provide for a flush request to be provided to each of a plurality of Node Bs utilized as serving cells in the multipoint HSDPA system, so that stale packets are not retained in internal buffers at the Node Bs following the RLC reset procedure. In some examples, the RLC reset procedure is only completed after confirmation that the flush of the internal buffers has been completed. Confirmation may be explicitly provided by each Node B utilizing a backhaul interface, or may be implicitly determined utilizing timers or signaling between the respective Node Bs.

30 Claims, 14 Drawing Sheets

(56) References Cited

U.S. PATENT DOCUMENTS

| | | |
|---|---|---|
| 7,821,975 B2 | 10/2010 | Burbidge et al. |
| 8,199,650 B2 * | 6/2012 | Terry et al. .................... 370/235 |
| 2002/0107019 A1 * | 8/2002 | Mikola et al. ................. 455/436 |
| 2003/0016698 A1 * | 1/2003 | Chang et al. ................... 370/469 |
| 2008/0026741 A1 | 1/2008 | Nakamata et al. |
| 2009/0237573 A1 * | 9/2009 | Hornback et al. ............ 348/734 |
| 2009/0264127 A1 | 10/2009 | Chun et al. |
| 2011/0103292 A1 * | 5/2011 | Pasad et al. ................... 370/315 |
| 2013/0176988 A1 * | 7/2013 | Wang et al. ................... 370/331 |

OTHER PUBLICATIONS

International Search Report and Written Opinion—PCT/US2011/066896—ISA/EPO—May 3, 2012.

* cited by examiner

SYSTEM AND METHOD FOR PERFORMING A RADIO LINK CONTROL (RLC) RESET IN A DOWNLINK MULTIPOINT SYSTEM

CROSS-REFERENCE TO RELATED APPLICATIONS

This application claims priority to and the benefit of provisional patent application No. 61/426,582, filed in the United States Patent and Trademark Office on Dec. 23, 2010, the entire content of which is incorporated herein by reference.

BACKGROUND

1. Field

Aspects of the present disclosure relate generally to wireless communication systems, and more particularly, to a reset procedure for resetting peer entities to a default state in a wireless communication system.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications. For example, recent developments include the provision of downlink carrier aggregation in various forms, wherein a UE can receive downlink carriers from the same Node B in adjacent carrier frequencies (i.e., dual carrier HSDPA) or wherein a UE can receive downlink carriers from separate cells in the same carrier frequency (i.e., multipoint HSDPA). In particular, the multipoint HSDPA system has garnered substantial interest due to the capability to obtain many benefits of multicarrier frequency aggregation while only utilizing a single carrier frequency. However, due to the novelty of the only recently developed multipoint HSDPA system, there remains a number of issues to work out that are generally unique to this system.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In accordance with various aspects of the disclosure, an RLC reset procedure may be tailored for a multipoint HSDPA system. Some aspects of the disclosure provide for a flush request to be provided to each of a plurality of Node Bs utilized as serving cells in the multipoint HSDPA system, so that stale packets are not retained in internal buffers at the Node Bs following the RLC reset procedure. In some examples, the RLC reset procedure is only completed after confirmation that the flush of the internal buffers has been completed. Confirmation may be explicitly provided by each Node B utilizing a backhaul interface, or may be implicitly determined utilizing timers or signaling between the respective Node Bs.

For example, in one aspect, the disclosure provides a method of wireless communication. This exemplary method includes allocating at least a portion of an RLC flow to each of a plurality of base stations for transmission to a user equipment, and beginning an RLC reset procedure to reset the RLC flow. Further, the method includes transmitting a flush request to each of the plurality of base stations to request that the base stations each flush an internal buffer related to the RLC flow, and completing the RLC reset procedure after completion of the flush of the internal buffer of each of the plurality of base stations.

Another aspect of the disclosure provides a method of wireless communication operable at a base station, which includes receiving a flush request from an RNC, flushing all internal buffers relating to an RLC flow provided by the RNC, and transmitting a flush confirmation to the RNC indicating that the flushing of the internal buffers is complete.

Another aspect of the disclosure provides a method of wireless communication operable at a base station, which includes receiving a flush request from an RNC, flushing at least one internal buffer relating to an RLC flow provided by the RNC, receiving a reset packet from the RNC for resetting a user equipment, and transmitting the reset packet to the user equipment after determining that at least one disparate base station has completed a flush of at least one internal buffer relating to the RLC flow provided by the RNC.

Another aspect of the disclosure provides an apparatus configured for wireless communication. The apparatus includes at least one processor, a communication interface coupled to the at least one processor for transmitting information to a plurality of base stations, and a memory coupled to the at least one processor. Here, the at least one processor is configured to allocate at least a portion of an RLC flow to each of the plurality of base stations for transmission to a user equipment, to begin an RLC reset procedure to reset the RLC flow, to transmit a flush request to each of the plurality of base stations to request that the base stations each flush an internal buffer related to the RLC flow, and to complete the RLC reset procedure after completion of the flush of the internal buffer of each of the plurality of base stations.

Another aspect of the disclosure provides a base station configured for wireless communication. The base station includes at least one processor, a memory coupled to the at least one processor, and a communication interface coupled to the at least one processor for transmitting information to an RNC. Here, the at least one processor is configured to receive a flush request from the RNC, to flush all internal buffers relating to an RLC flow provided by the RNC, and to transmit a flush confirmation to the RNC, indicating that the flushing of the internal buffers is complete.

Another aspect of the disclosure provides a base station configured for wireless communication. The base station includes at least one processor, a memory coupled to the at least one processor, a communication interface coupled to the at least one processor for transmitting information to an RNC, and a transmitter coupled to the at least one processor for transmitting information to a user equipment. Here, the at least one processor is configured to receive a flush request from an RNC, to flush at least one internal buffer relating to an RLC flow provided by the RNC, to receive a reset packet from the RNC for resetting the user equipment, and to transmit the reset packet to the user equipment after determining that at least one disparate base station has completed a flush of at least one internal buffer relating to the RLC flow provided by the RNC.

Another aspect of the disclosure provides an apparatus for wireless communication, which includes means for allocating at least a portion of an RLC flow to each of a plurality of base stations for transmission to a user equipment, means for beginning an RLC reset procedure to reset the RLC flow, means for transmitting a flush request to each of the plurality of base stations to request that the base stations each flush an internal buffer related to the RLC flow, and means for completing the RLC reset procedure after completion of the flush of the internal buffer of each of the plurality of base stations.

Another aspect of the disclosure provides a base station configured for wireless communication, which includes means for receiving a flush request from an RNC, means for flushing all internal buffers relating to an RLC flow provided by the RNC, and means for transmitting a flush confirmation to the RNC, indicating that the flushing of the internal buffers is complete.

Another aspect of the disclosure provides a base station configured for wireless communication, which includes means for receiving a flush request from an RNC, means for flushing at least one internal buffer relating to an RLC flow provided by the RNC, means for receiving a reset packet from the RNC for resetting a user equipment, and means for transmitting the reset packet to the user equipment after determining that at least one disparate base station has completed a flush of at least one internal buffer relating to the RLC flow provided by the RNC.

Another aspect of the disclosure provides a computer program product, including a computer readable medium having instructions for causing a computer to allocate at least a portion of an RLC flow to each of a plurality of base stations for transmission to a user equipment, instructions for causing a computer to begin an RLC reset procedure to reset the RLC flow, instructions for causing a computer to transmit a flush request to each of the plurality of base stations to request that the base stations each flush an internal buffer related to the RLC flow, and instructions for causing a computer to complete the RLC reset procedure after completion of the flush of the internal buffer of each of the plurality of base stations.

Another aspect of the disclosure provides a computer program product, including a computer readable medium having instructions for causing a computer to receive a flush request from an RNC, instructions for causing a computer to flush all internal buffers relating to an RLC flow provided by the RNC, and instructions for causing a computer to transmit a flush confirmation to the RNC indicating that the flushing of the internal buffers is complete.

Another aspect of the disclosure provides a computer program product, including a computer readable medium having instructions for causing a computer to receive a flush request from an RNC, instructions for causing a computer to flush at least one internal buffer relating to an RLC flow provided by the RNC, instructions for causing a computer to receive a reset packet from the RNC for resetting a user equipment, and instructions for causing a computer to transmit the reset packet to the user equipment after determining that at least one disparate base station has completed a flush of at least one internal buffer relating to the RLC flow provided by the RNC.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
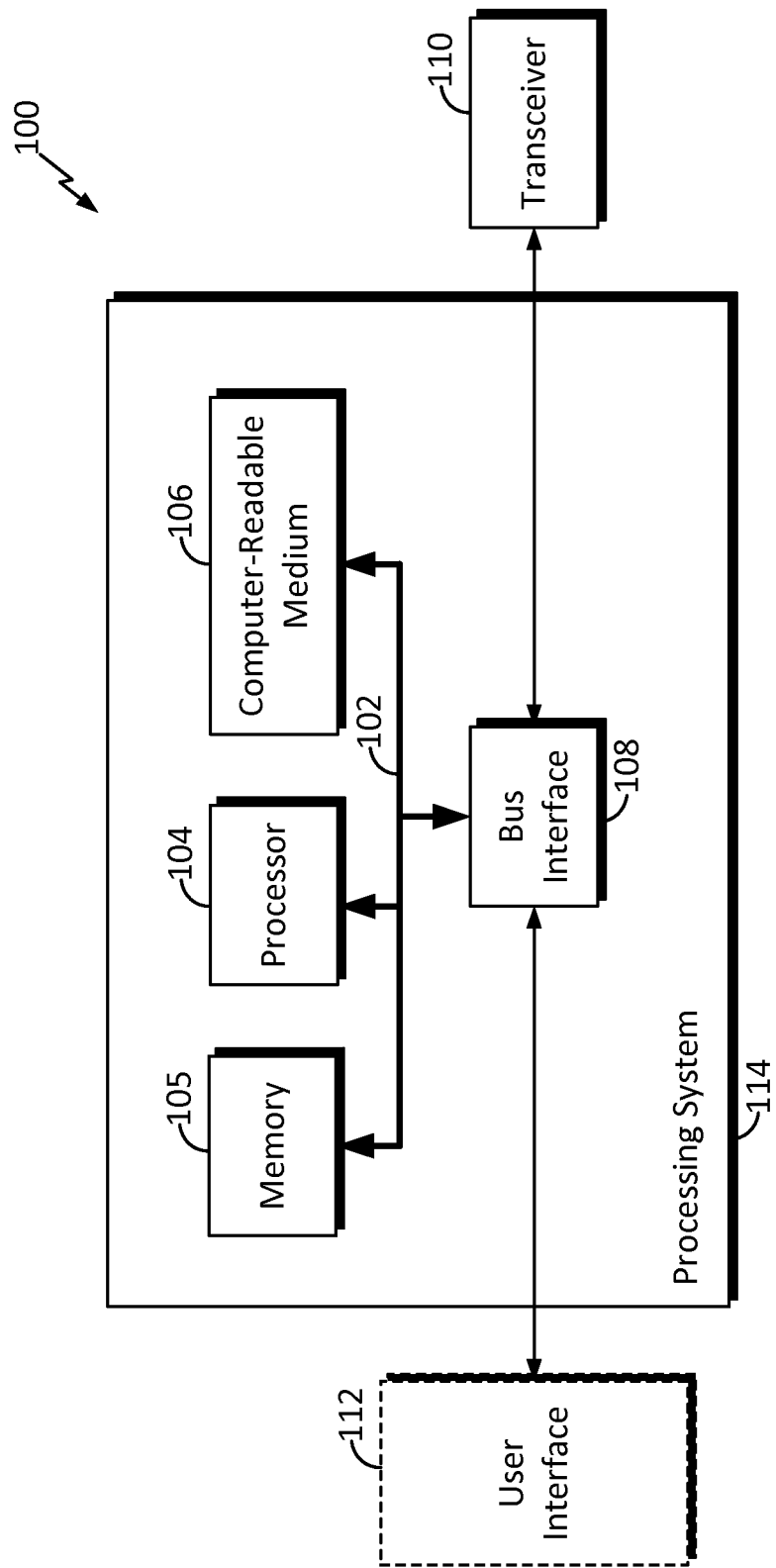
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
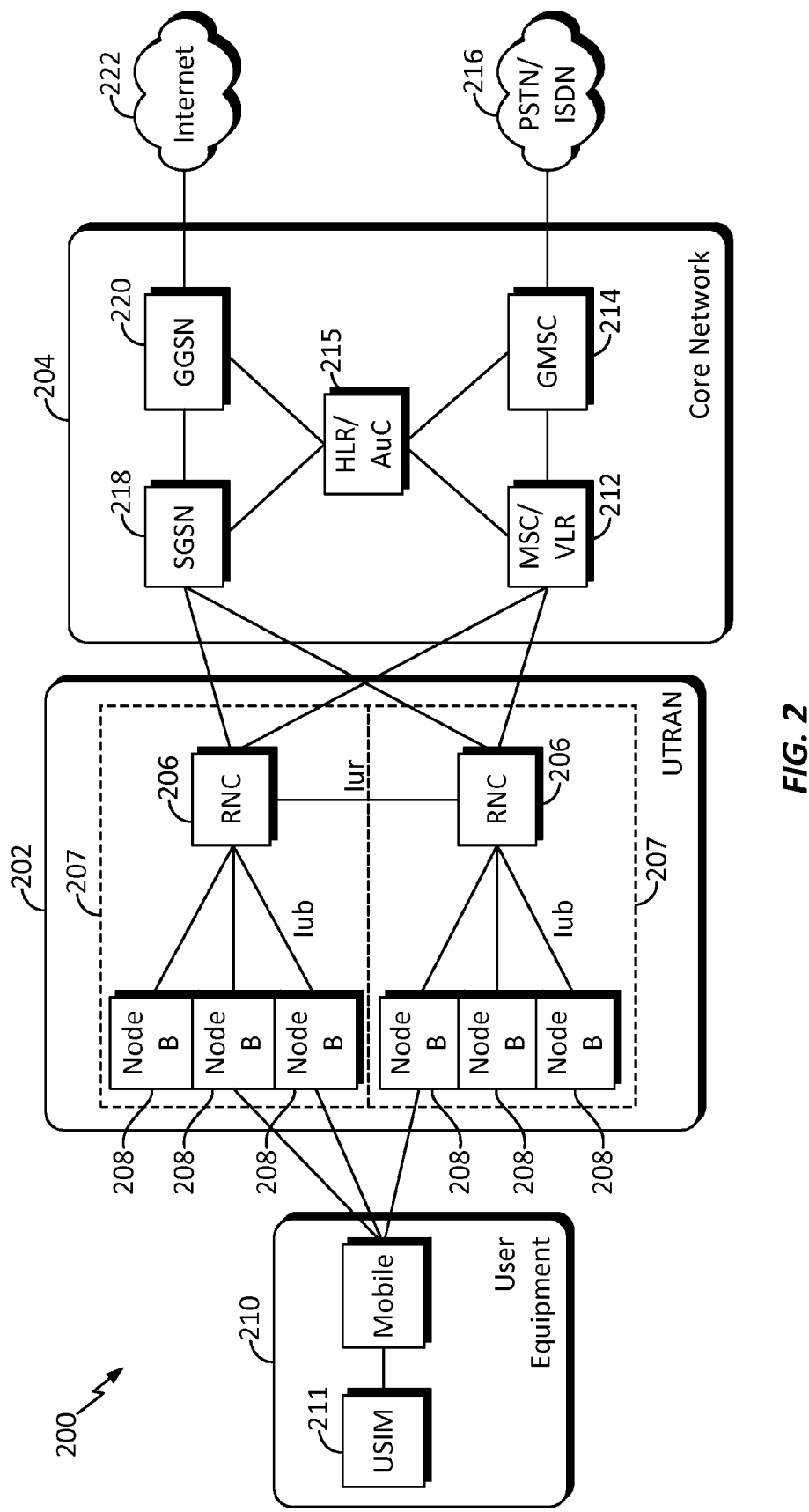
FIG. 2 is a block diagram conceptually illustrating an example of a telecommunications system.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a core network 204, a radio access network (RAN) (e.g., the UMTS Terrestrial Radio Access Network (UTRAN) 202), and a user equipment (UE) 210. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

Figure 3:
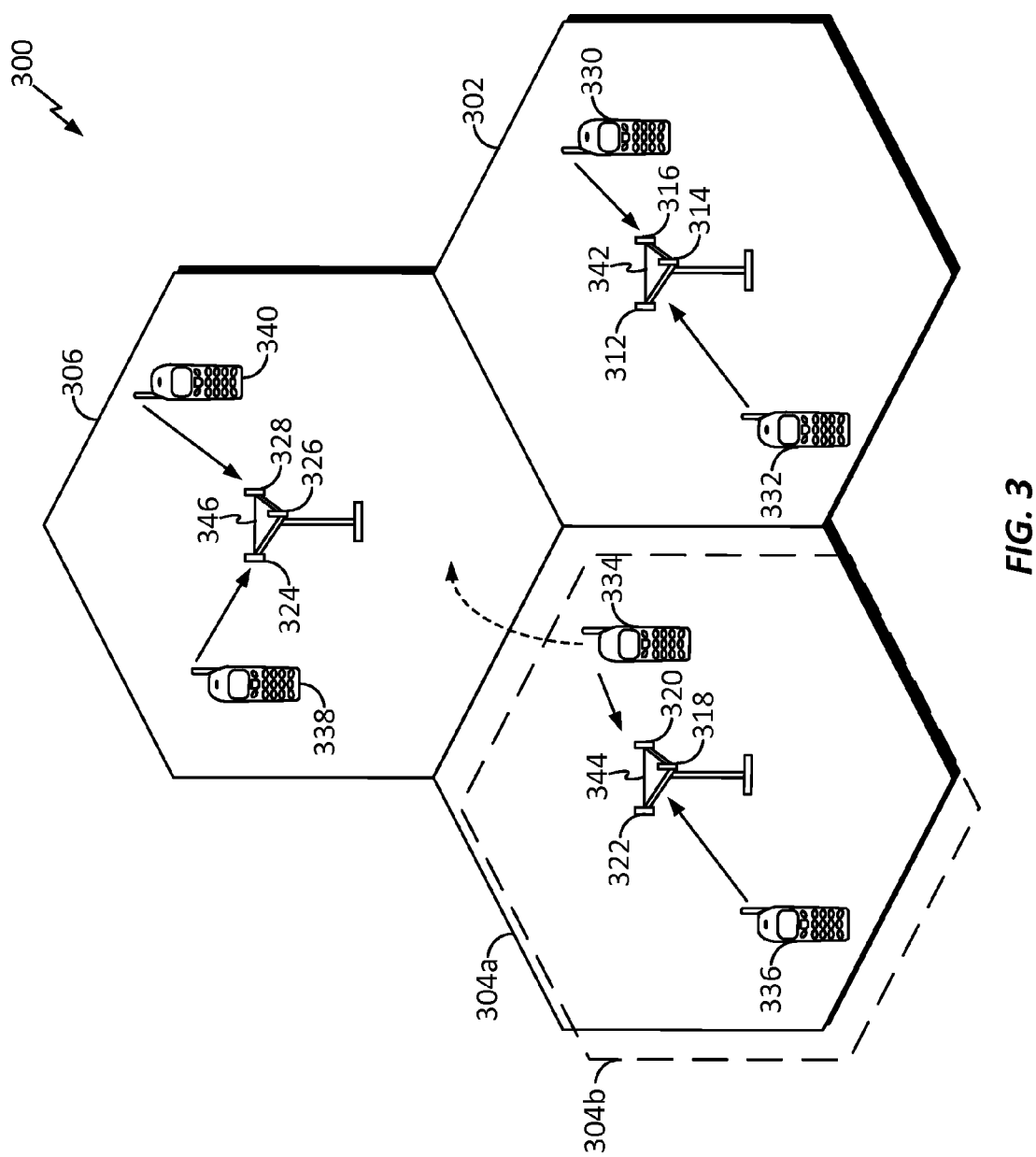
FIG. 3 is a conceptual diagram illustrating an example of an access network.

The UTRAN 202 is one example of a RAN that may be utilized in accordance with the present disclosure. Referring to FIG. 3, by way of example and without limitation, a simplified schematic illustration of a RAN 300 in a UTRAN architecture is illustrated. The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304*a* may utilize a first scrambling code, and cell 304*b*, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UEs 334 and 336 may be in communication with Node B 344, and UEs 338 and 340 may be in communication with Node B 346. Here, each Node B 342, 344, and 346 may be configured to provide an access point to a core network 204 (see FIG. 2) for all the UEs 330, 332, 334, 336, 338, and 340 in the respective cells 302, 304, and 306.

During a call with a source cell, or at any other time, the UE 336 may monitor various parameters of the source cell as well as various parameters of neighboring cells. Further, depending on the quality of these parameters, the UE 336 may maintain communication with one or more of the neighboring cells. During this time, the UE 336 may maintain an Active Set, that is, a list of cells to which the UE 336 is simultaneously connected (i.e., the UTRAN cells that are currently assigning a downlink dedicated physical channel DPCH or fractional downlink dedicated physical channel F-DPCH to the UE 336 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 408 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

A high speed packet access (HSPA) air interface includes a series of enhancements to the 3G/W-CDMA air interface between the UE 210 and the UTRAN 202, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

For example, in Release 5 of the 3GPP family of standards, HSDPA was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-SCCH is a physical channel that may be utilized to carry downlink control information related to the transmission of HS-DSCH. Here, the HS-DSCH may be associated with one or more HS-SCCH. The UE may continuously monitor the HS-SCCH to determine when to read its data from the HS-DSCH and to determine the modulation scheme used on the assigned physical channel.

The HS-PDSCH is a physical channel that may be shared by several UEs and may carry downlink data for the high-speed downlink. The HS-PDSCH may support quadrature phase shift keying (QPSK), 16-quadrature amplitude modulation (16-QAM), and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

One difference on the downlink between Release-5 HSDPA and the previously standardized circuit-switched air-interface is the absence of soft handover in HSDPA. This means that HSDPA channels are transmitted to the UE from a single cell called the HSDPA serving cell. As the user moves, or as one cell becomes preferable to another, the HSDPA serving cell may change. Still, the UE may be in soft handover on the associated DPCH, receiving the same information from plural cells.

In Release 5 HSDPA, at any instance a UE 210 has one serving cell: the strongest cell in the active set as according to the UE measurements of $E_c/I_0$. According to mobility procedures defined in Release 5 of 3GPP TS 25.331, the radio resource control (RRC) signaling messages for changing the HSPDA serving cell are transmitted from the current HSDPA serving cell (i.e., the source cell) and not the cell that the UE reports as being the stronger cell (i.e., the target cell).

Release 8 of the 3GPP standards introduced dual carrier HSDPA (DC-HSDPA), which enables a UE to aggregate dual adjacent 5-MHz downlink carriers transmitted by a Node B 208. The dual carrier approach provides higher downlink data rates and better efficiency at multicarrier sites. Generally, DC-HSDPA utilizes a primary carrier and a secondary carrier, where the primary carrier provides the channels for downlink data transmission and the channels for uplink data transmission and the secondary carrier provides a second set of HS-PDSCHs and HS-SCCHs for downlink communication. Here, the primary carrier is generally the best serving HS-DSCH cell according to the UE measurements of $E_c/I_0$.

As discussed above, DC-HSDPA provides for downlink carrier aggregation. The carrier aggregation achieved in 3GPP Release 8 DC-HSDPA and its subsequent enhancements provides benefits in terms of user experience, including latency reduction for bursty traffic.

According to some aspects of the present disclosure, another form of aggregation, which may be referred to as soft aggregation, provides for downlink aggregation wherein the respective downlink cells utilize the same frequency carrier. Soft aggregation strives to realize similar gains to DC-HSDPA in a single-carrier network.

Figure 4:
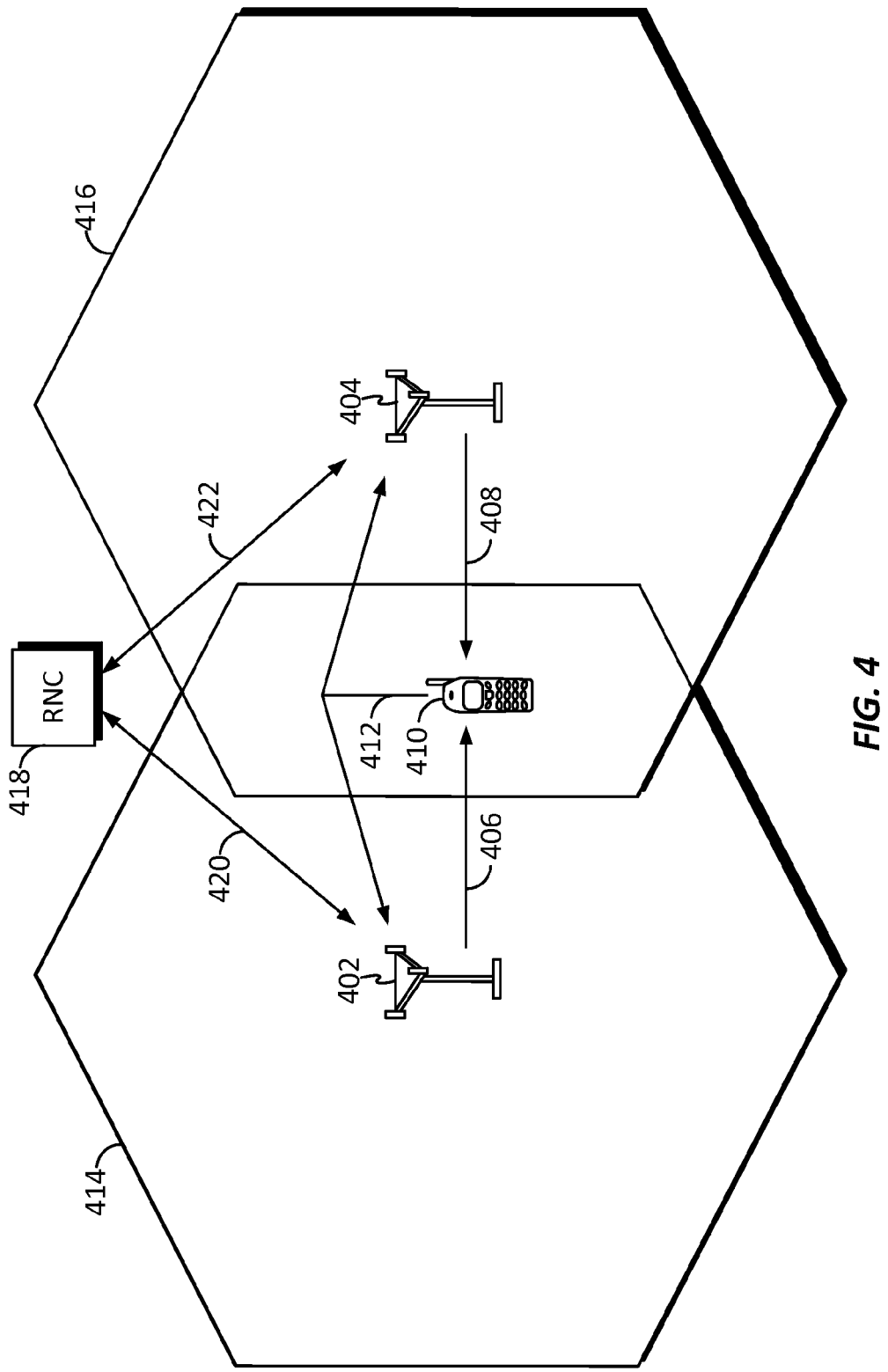
FIG. 4 is a schematic diagram illustrating a portion of a multipoint HSDPA network.

FIG. 4 illustrates an exemplary system for soft aggregation in accordance with some aspects of the present disclosure. In FIG. 4, there may be a geographic overlap between two or more cells 414 and 416, such that a UE 410 may be served, at least for a certain period of time, by the multiple cells. Here, referring again to FIG. 2, the UE 410 is one example of a UE 210 that may be utilized in a UMTS system 200 in accordance with some aspects of the present disclosure. That is, a wireless telecommunication system in accordance with the present disclosure may provide HSDPA service from a plurality of cells on a single frequency channel, such that a UE 410 may perform aggregation. Here, the UE 410 may aggregate downlinks from a primary serving cell and at least one secondary serving cell. For example, a setup utilizing two or more cells may be referred to as multi-flow HSDPA (MF-HSDPA), coordinated multi-point HSDPA (COMP HSDPA), or simply multipoint HSDPA. One particular configuration of a multipoint HSDPA system that utilizes two cells is sometimes referred to as single frequency dual cell HSDPA (SF-DC-HSDPA). However, other terminology may freely be utilized. In this example, users at cell boundaries, as well as the overall system, may benefit from a high throughput. In various examples, the different cells may be provided by the same Node B or the different cells may be provided by separate Node Bs.

In the scheme illustrated in FIG. 4, two Node Bs 402 and 404 each provide downlink channels 406 and 408, respectively, wherein the downlink channels are in substantially the same carrier frequency. Of course, as already described, in another example, both downlink channels 406 and 408 may be provided from different sectors of the same Node B. The UE 410 receives and aggregates the downlink channels and provides an uplink channel 412, which may be received by one or both Node Bs 402 and 404. The uplink channel 412 from the UE 410 may provide feedback information (e.g., corresponding to the downlink channel state) for the corresponding downlink channels 406 and 408.

A DC-HSDPA-capable UE has two receive chains, each of which may be used to receive HS data from a different carrier. In a multi-point HSDPA-capable UE 410 according to an aspect of the present disclosure, if the plural receive chains are made to receive HS data from different cells, at least some the benefits from multicarrier aggregation can be realized in a single-carrier network.

Figure 5:
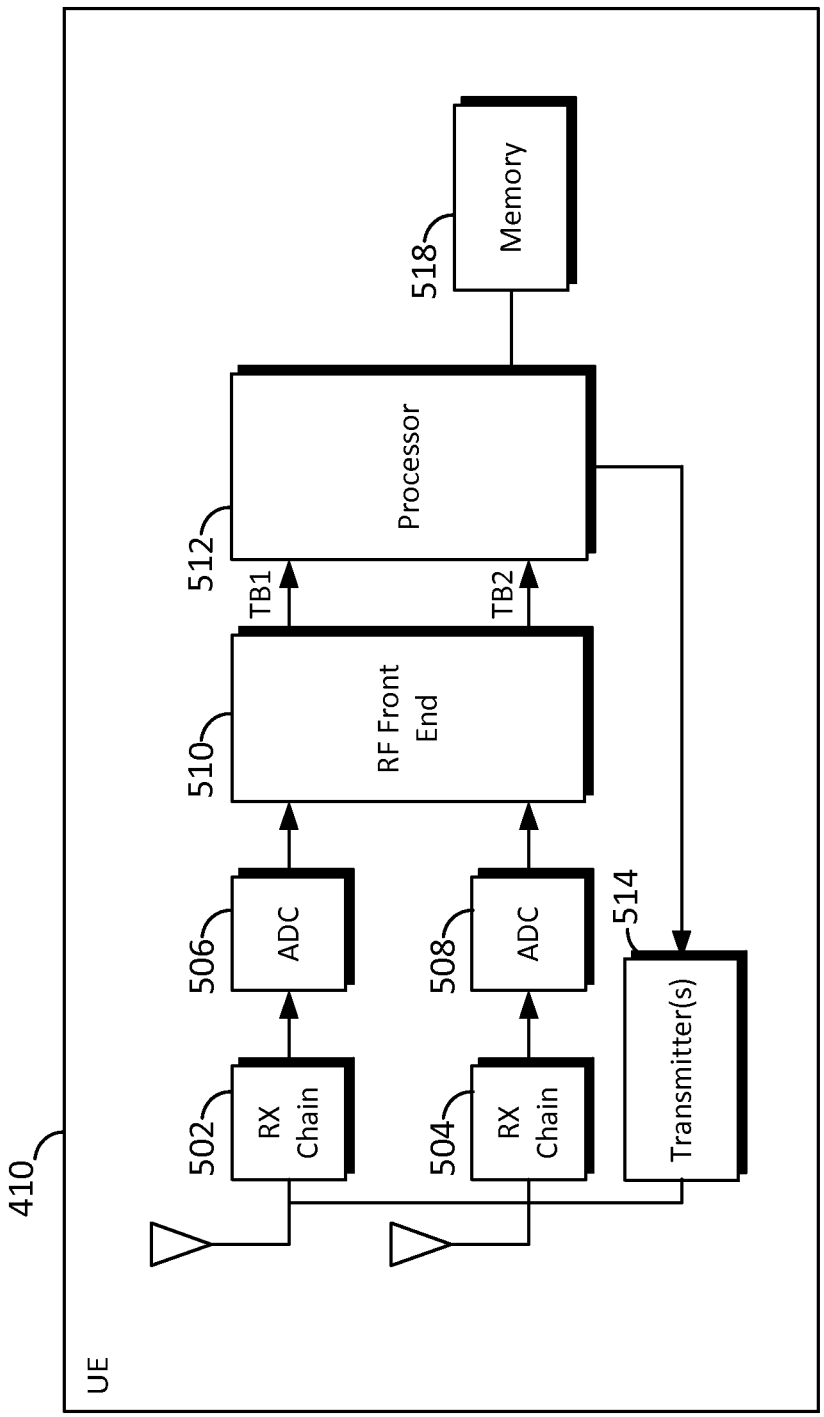
FIG. 5 is a simplified block diagram illustrating a portion of a UE capable of being utilized in a SF-DC HSDPA implementation of a multipoint HSDPA network.

FIG. 5 is a simplified block diagram illustrating some of the components of an exemplary UE 410 for use in a SF-DC-HSDPA network in accordance with some aspects of the present disclosure. In the illustration, the UE 410 includes two receive chains 502 and 504 for receiving respective downlink signals in the same carrier frequency, as in a SF-DC-HSDPA network. However, within the scope of the present disclosure, a UE 410 may include any number of receive chains for receiving downlink signals in the same carrier frequency or in any suitable number of different carrier frequencies.

Coupled to the receive chains 502 and 504 may be respective analog to digital converters 506 and 508, which may transform the received downlink channels to the digital domain to be further processed by an RF front end 510. The RF front end 510 may then provide the received transport blocks to a processor 512 to be further processed in accordance with the received information. In some examples, the processor 512 may be the same as the processing system 114 illustrated in FIG. 1. The processor 512 may additionally be coupled to one or more transmitters 514, which may utilize one or more of the UE's antennas as managed by a suitable duplexer. The processor 512 may additionally utilize a memory 518 for storing information useful for the processing of the information.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 210 and the core network 204 (referring to FIG. 2), and may include circuit switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 6:
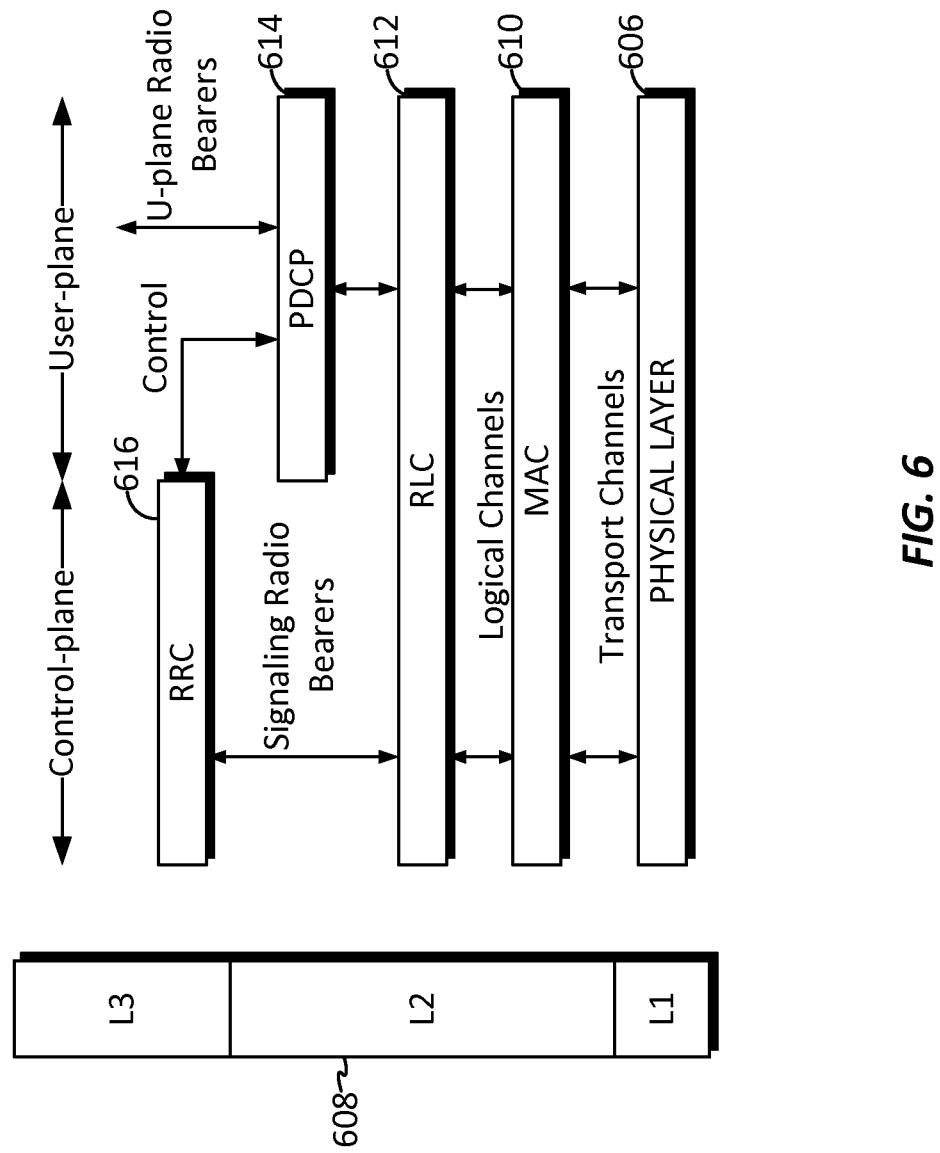
FIG. 6 is a conceptual diagram illustrating an example of a radio protocol architecture for the user and control plane.

Turning to FIG. 6, the AS is shown with three layers: Layer 1, Layer 2, and Layer 3. Layer 1 is the lowest layer and implements various physical layer signal processing functions. Layer 1 will be referred to herein as the physical layer 606. The data link layer, called Layer 2 608, is above the physical layer 606 and is responsible for the link between the UE 210 and Node B 208 over the physical layer 606.

At Layer 3, the RRC layer 616 handles the control plane signaling between the UE 210 and the Node B 208. RRC layer 616 includes a number of functional entities for routing higher layer messages, handling broadcasting and paging functions, establishing and configuring radio bearers, etc.

In the illustrated air interface, the L2 layer 608 is split into sublayers. In the control plane, the L2 layer 608 includes two sublayers: a medium access control (MAC) sublayer 610 and a radio link control (RLC) sublayer 612. In the user plane, the L2 layer 608 additionally includes a packet data convergence protocol (PDCP) sublayer 614. Although not shown, the UE may have several upper layers above the L2 layer 608 including a network layer (e.g., IP layer) that is terminated at a PDN gateway on the network side and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between Node Bs.

The RLC sublayer 612 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

Figure 7:
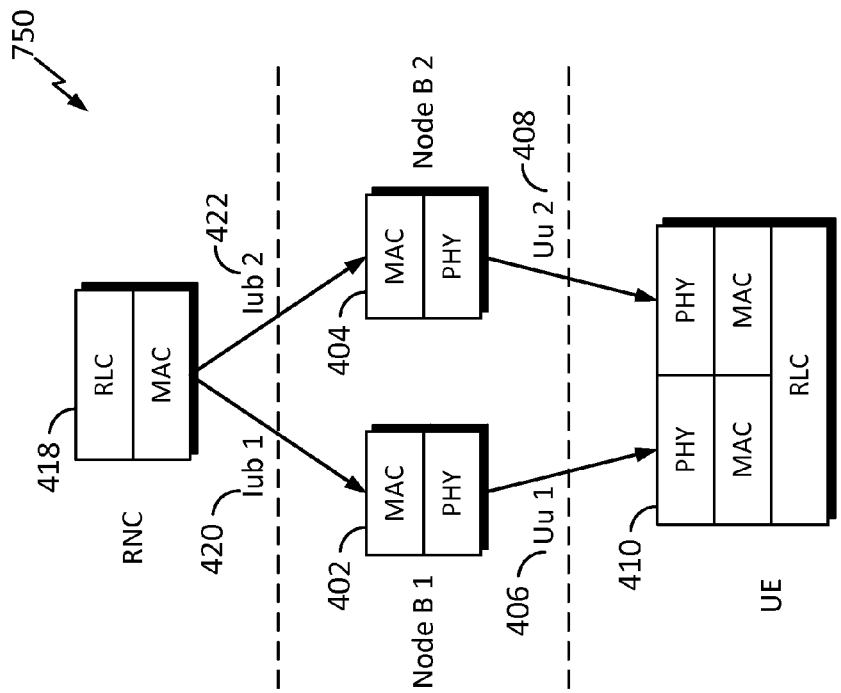
FIG. 7 is a conceptual diagram illustrating some of the layers utilized in a downlink path between an RNC and a UE, comparing a conventional HSDPA network and an SF-DC HSDPA network.
Figure 7:
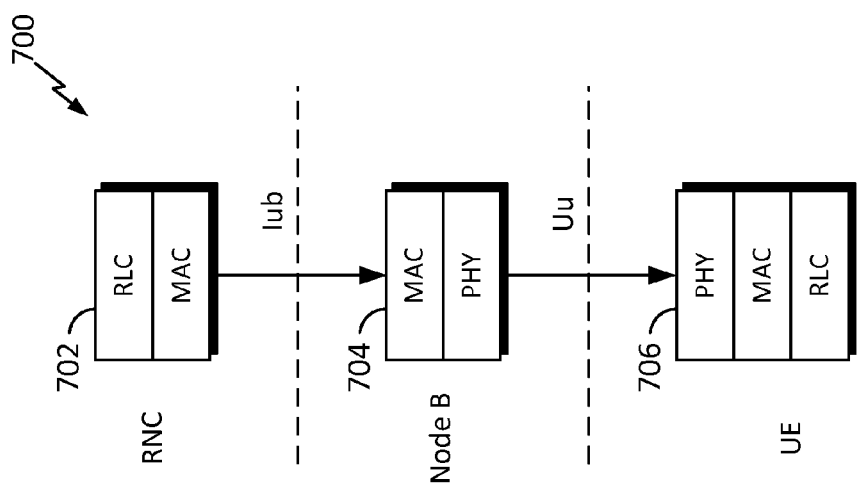

FIG. 7 is a schematic illustration comparing downlink paths in an HSDPA network 700 and an SF-DC-HSDPA network 750. The SF-DC-HSDPA network 750 may be the same as the system configured for soft aggregation and illustrated in FIG. 4.

In the HSDPA example 700 (the same or similar illustration may also apply to a DC-HSDPA network), a downlink path between an RNC 702 and a UE 706 passes through a Node B 704. Here, the RNC 702 houses protocol layers from the MAC layer and above, including, for example, the RLC sublayer. For the high-speed downlink channels, a MAC layer also resides at the Node B 704. Further, a PHY layer at the Node B 704 provides an air interface for communicating with a corresponding PHY layer at the UE 706 (e.g., over an HS-DSCH).

From the UE 706 side, a MAC entity is configured to control access to the dedicated transport channels, to handle the HSDPA-specific functions, and to control access to the HS-DSCH transport channel. Upper layers within the UE 706 may configure which of two different MAC entities, a MAC-hs or a MAC-ehs, is to be applied to handle HS-DSCH functionality.

On the other hand, in the SF-DC-HSDPA network 750, the RNC 418 may provide packets from an RLC flow to a plurality of Node Bs 402 and 404, each providing respective downlink HS-transmissions to the UE 410. Thus, the RNC 418 may include a multi-link RLC sublayer, wherein a flow control algorithm may allocate packets from an RLC flow for the UE 410 among the plurality of cells (e.g., at Node Bs 402 and 404) utilizing respective Iub interfaces 420 and 422. Of course, the multi-link RLC implementation is only one example of a multipoint HSDPA system, provided herein only for clarity of explanation. Those of ordinary skill in the art will understand that other implementations of downlink carrier aggregation may be utilized within the scope of the present disclosure.

Here, the UE 410 may include a plurality of MAC entities, each of the plurality of MAC entities corresponding to a different serving cell (e.g., a primary serving cell and a secondary serving cell) from corresponding Node B sites. For example, a first MAC entity in the UE 410 may correspond to the first Node B 402 providing a primary serving cell and a second MAC entity in the UE 410 may correspond to the second Node B 404 providing a secondary serving cell. Of course, for various reasons, the pairing of a particular MAC entity with a particular Node B may change over time and the illustration is only one possible example.

In RLC acknowledged mode (AM), any of various error conditions, such as a loss of synchronization between peer RLC entities, can result in the need to reset the RLC sublayers. In an RLC reset procedure, the RLC sublayer 612 may reset the two RLC peer entities (i.e., the RLC entity in a sender and the one in a receiver of a transmission). In the RLC reset procedure, the sequence numbers and state variables at the receiver and sender entities are generally reset to initial values, and a command to move the receiving window is transmitted such that the receiving entity may discard any received AM data PDUs corresponding to discarded packets.

Figure 8:
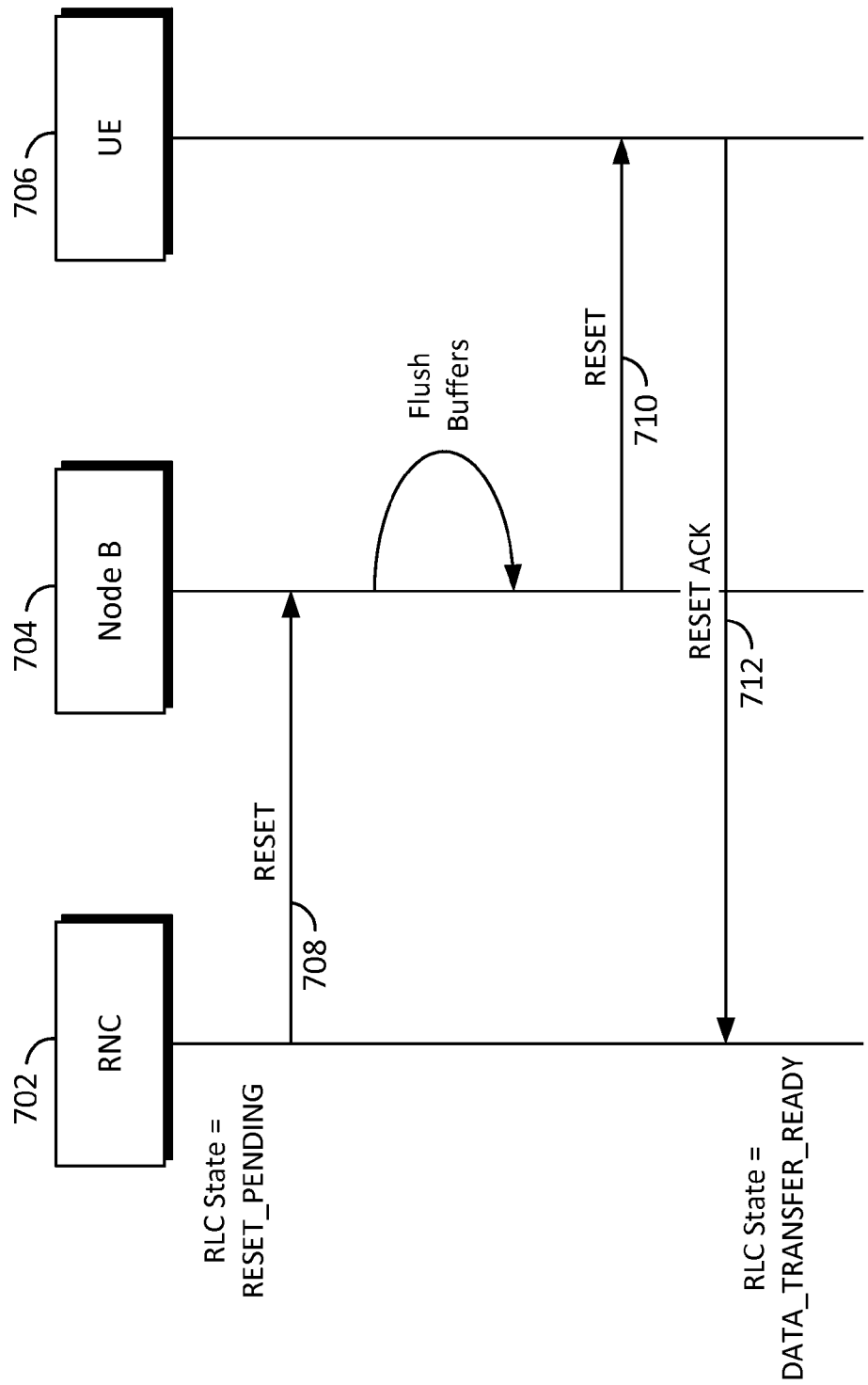
FIG. 8 is a call flow diagram illustrating a conventional RLC reset procedure in an HSDPA network.

In each of the call flow diagrams that follow, time moves forward in the downward direction and signaling between nodes is represented as arrows from a line corresponding to the transmitting node to a line corresponding to the receiving node. FIG. 8 illustrates a conventional procedure for a downlink RLC reset, where the RNC initiates the reset, in accordance with publicly available 3GPP specifications. Of course, in some examples an RLC reset may be initiated by any RLC peer entity, including the RNC or the UE. In the illustrated diagram, the nodes correspond to the conventional HSDPA system 700 illustrated in FIG. 7. That is, the system includes an RNC 702, a Node B 704, and a UE 706.

Responsive to any of various error conditions such as a loss of synchronization between peer RLC entities (e.g., the RNC 702 and the UE 706), an AM RLC entity may enter into an RLC state of RESET_PENDING. That is, the RNC 702 may send an RLC Reset PDU 708 to lower layers, which may be forwarded to the Node B 704. Here, the RLC state may change from a ready state to a pending state, in which there is generally no data exchange between the UE 706 and the RNC 702. Thus, the RNC 702 may stop transmitting any acknowledged mode data PDU or RLC Status PDUs and may ignore any incoming acknowledged mode data PDUs, RLC Status PDUs, or piggybacked Status PDUs. In some examples, the MAC entity at the RNC 702 may provide a flush request along with the RLC Reset PDU 708 to the Node B 704. In response to the flush request, the Node B 704 may flush its internal buffers related to the RLC flow. This flushing of the internal buffers related to the RLC flow is done to ensure that the buffers in the Node B 704 are cleaned, such that the RNC 702 can transmit RLC PDUs with new sequence numbers after the RLC reset procedure. After flushing its internal buffers, the Node B 704 may provide an RLC Reset PDU 710 to the UE 706, which may complete its own reset procedure in response. The RLC reset procedure may then be completed upon a reception of a reset acknowledgment PDU 712 from the UE 706 at the RNC 702. After receiving the reset acknowledgment PDU 712, the RNC 702 may then send a reset acknowledgment PDU to lower layers and may reset various state variables to their initial values. Here, all RLC PDUs in the receiving side may be discarded, as well as all RLC SDUs that were transmitted before the RLC reset procedure at the transmitting side of the AM RLC entity. Following the RLC reset procedure described here, the peer RLC entities may return to an RLC state of DATA_TRANSFER_READY.

When implementing the two downlinks in the SF-DC system 750 described above in relation to FIG. 7, however, the same RLC reset procedure can present certain problems. That is, in an SF-DC HSDPA system according to some of the aspects of the present disclosure, the data PDUs may be transmitted on both links corresponding to the primary serving cell and the secondary serving cell, but control PDUs may only be transmitted on the primary link corresponding to the primary serving cell. Thus, in the SF-DC system, only the Node B in the primary link would be flushed and other Node Bs (e.g., when there are one or more secondary serving cells) would retain stale RLC PDUs after the RLC reset procedure.

Figure 9:
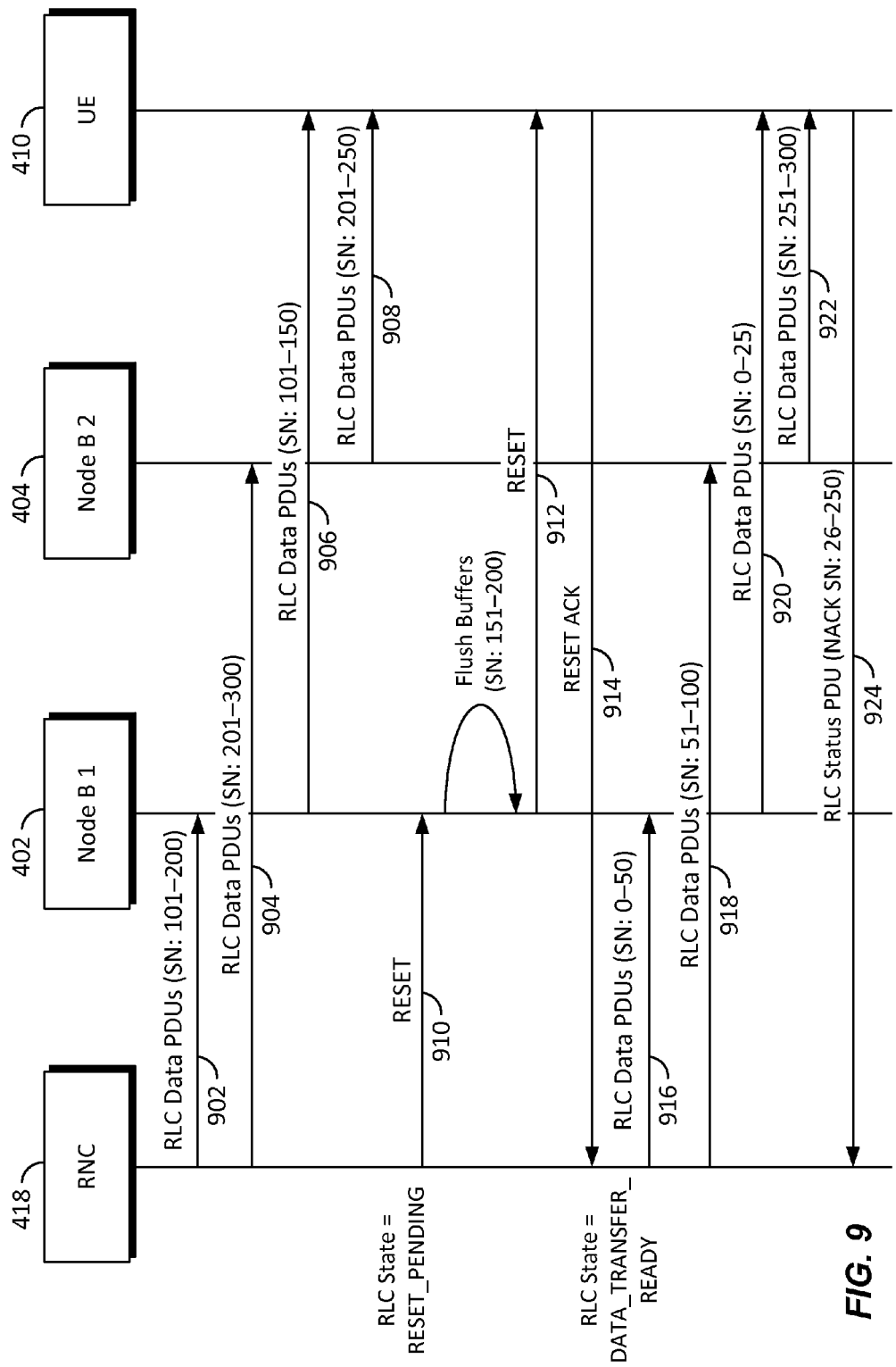
FIG. 9 is a call flow diagram illustrating an issue that may arise during an RLC reset procedure in a SF-DC HSDPA network.

FIG. 9 is a simplified call flow diagram illustrating this issue in further detail. In the illustrated examples that follow, certain specific sequence numbers are provided only for clarity of explanation and those of ordinary skill in the art will comprehend that real-world examples might include any suitable sequence numbers other than those provided herein. Here, the illustrated system may be the same as the SF-DC HSDPA system 750 described above in relation to FIG. 7. As shown in FIG. 9, an RNC 418 may provide respective parts of an RLC flow to a first Node B 402, corresponding to a primary serving cell, and a second Node B 404, corresponding to a secondary serving cell. For example, the RNC 418 may transmit, over a first Iub backhaul interface 420, RLC data PDUs 902 having RLC sequence numbers 101-200 to the first Node B 402, and may transmit RLC data PDUs 904 having RLC sequence numbers 201-300 to the second Node B 404. The first Node B 402 may then attempt to transmit a batch 906 of RLC data PDUs (e.g., having sequence numbers 101-150) to the UE 410 and the second Node B 404 may further attempt to transmit a batch 908 of RLC data PDUs (e.g., having sequence numbers 201-250) to the UE 410. For any one or more of various reasons, such as a loss of synchronization between RLC peer entities, an RLC reset procedure may be initiated during the transmission of the RLC flow. That is, the RLC peer entities may enter an RLC state of RESET_PENDING.

Here, during the RLC reset procedure, if conventional signaling for an RLC reset is utilized, the RNC 418 may transmit an RLC Reset PDU 910 to the first Node B 402, which is the primary serving cell. The primary link with the first Node B 402 may be flushed, and as such, the RLC PDUs with sequence number 151-200, which are queued in internal buffers at the first Node B 402, may be flushed. On the other hand, because control PDUs such as the RLC Reset PDU 910 may be provided only to the first Node B 402 corresponding to the primary serving cell, the internal buffers of the second Node B 404 may not be flushed. As such, the RLC PDUs with sequence numbers 251-300 may remain queued in the internal buffers of the second Node B 404 even after the RLC reset procedure is completed. The first Node B 402, responsive to the RLC Reset PDU 910 received from the RNC 418, may transmit an RLC Reset PDU 912 to the UE 410. Here, the UE 410 may accordingly implement its corresponding reset procedure, responding with a reset acknowledgment signal 914.

Following the RLC reset procedure, the RNC 418 may transmit another multilink RLC flow, transmitting respective portions of an RLC flow to each of the first Node B 402 and the second Node B 404. For example, RLC data PDUs 916 having sequence numbers 0-50 may be transmitted to the first Node B 402 and RLC data PDUs 918 having sequence numbers 51-100 may be transmitted to the second Node B 404. The respective Node Bs may then transmit batches of their queued packets to the UE. That is, the first Node B 402 may transmit a batch 920 of RLC data PDUs having sequence numbers 0-25 to the UE 410. However, the second Node B 404 may transmit the "stale" packets that remained from prior to the RLC reset procedure (i.e., a batch 922 of RLC data PDUs having sequence numbers 251-300).

That is, the primary link with the first Node B 402 was flushed during the RLC reset procedure, as described above. Thus, the first queued packets to transmit from the first Node B 402 are the RLC data PDUs 916 having sequence numbers 0-50. In the illustrated example, the first Node B 402 may transmit a first batch 920 of packets (e.g., those having the sequence numbers 0-25) to the UE 410. Here, when the RLC receiver entity at the UE 410 receives the packets 920 having RLC sequence numbers 0-25, the UE 410 may accordingly advance its receive window, corresponding to the latest sequence numbers received following the RLC reset.

Further, as described above, the secondary link with the second Node B 404 was not flushed during the RLC reset procedure. Thus, the first queued packets to transmit remain from prior to the RLC reset procedure (i.e., packets having the sequence numbers 251-300). When a portion of this set of packets is transmitted to the UE 410, and the RLC receiver entity at the UE 410 receives one or more of the packets having the sequence numbers of 251-300 from the second Node B 404, it may cause a hole in the receive window. That is, since the packets 920 having RLC sequence numbers 0-25 were received and the receive window was accordingly advanced, the packets 922 having RLC sequence numbers 251-300 may be considered out of order. Therefore, the UE 410 may provide negative acknowledgments 924 corresponding to sequence numbers 26-250. In this case, the sender of the RLC flow (i.e., the RNC 418) may detect an error condition because the negative acknowledgments are incorrect. Thus, the sender may trigger a second RLC reset. This second RLC reset can thus result in unnecessary throughput loss. Further, depending on the exact scenario, still additional RLC resets may be triggered and the call may drop when the number of RLC resets reaches a maximum reset count.

In the above scenario, it may be noted that one issue to consider is that serving cells that are not the primary serving cell can contribute to the occurrence of the RLC reset by virtue of their buffers failing to be flushed. That is, in an aspect of the disclosure wherein control packets are not provided to at least one serving cell, such as the secondary serving cell, that secondary serving cell may not have a capability to determine that the reset is occurring and thus may retain queued data packets following the reset.

Thus, in accordance with various aspects of the present disclosure, the RLC reset procedure may further include a flush request being provided to each Node B that corresponds to a serving cell for the UE. In a still further aspect of the present disclosure, the reset procedure may continue until a confirmation of the flush procedure being completed at each of the serving cells is received.

Figure 10:
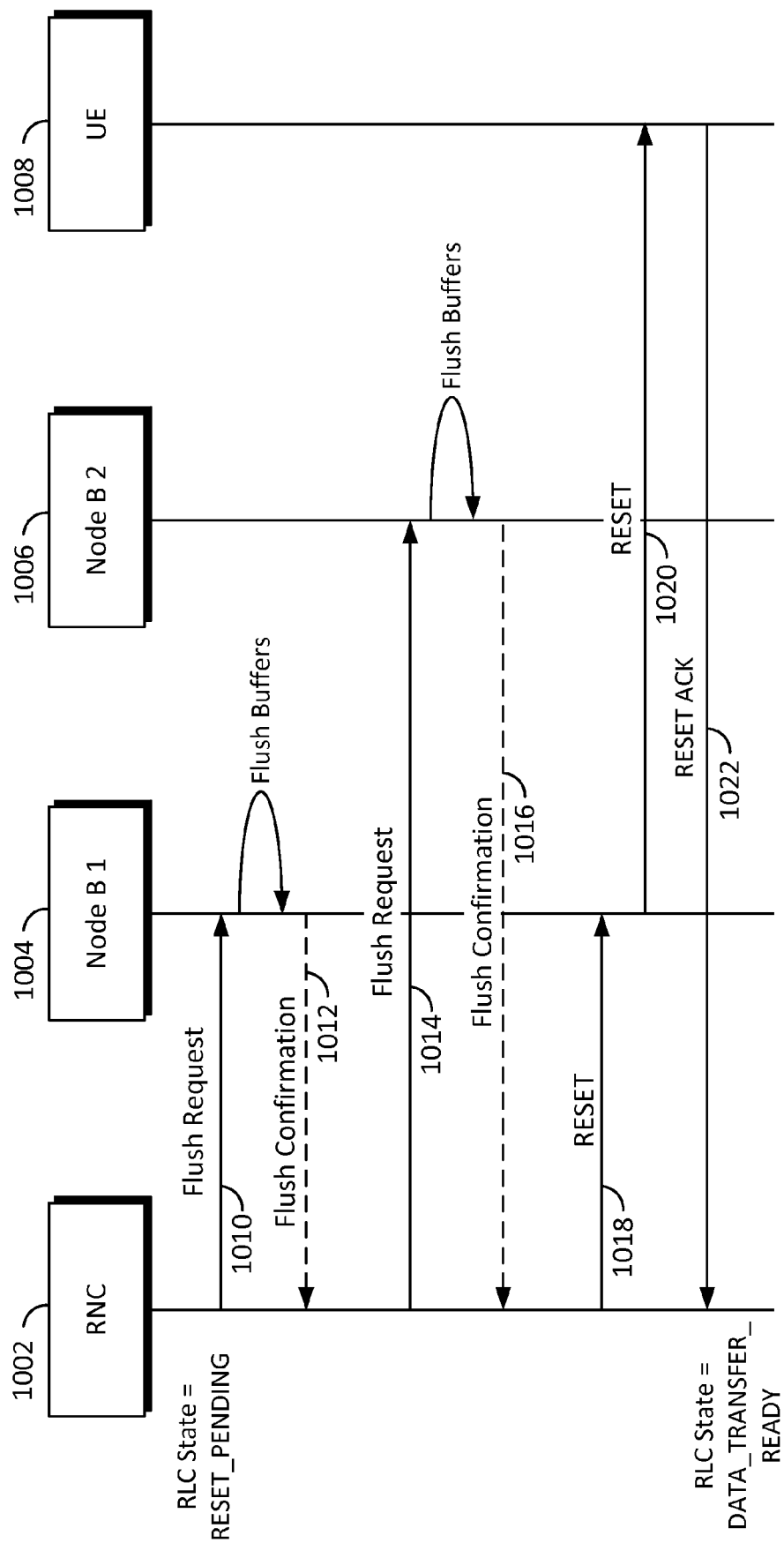
FIG. 10 is a call flow diagram illustrating an RLC reset procedure tailored for the multipoint HSDPA network, where the reset is initiated at the RNC.

FIG. 10 is a simplified call flow diagram illustrating an RLC reset procedure in accordance with an aspect of the present disclosure, wherein the RLC reset is initiated at the RLC entity located at the RNC. In some instances, the exemplary system illustrated in FIG. 11 may have a general architecture the same as the SF-DC HSDPA system 750 illustrated in FIG. 7; however, those of ordinary skill in the art will comprehend that this is only one example of a multipoint HSDPA system that might be used in accordance with various aspects of the present disclosure. That is, in various aspects, the communication with the second Node B corresponding to the secondary serving cell in the SF-DC HSDPA example may be generally the same as the communication with a plurality of secondary serving cells in essentially any multipoint HSDPA system.

The illustrated SF-DC HSDPA system includes an RNC 1002, which may be an RLC peer entity corresponding to an RLC flow from the RNC 1002 to a UE 1008. Here, the RLC flow may be divided among a first Node B 1004, corresponding to a primary serving cell, and a second Node B 1006, corresponding to a secondary serving cell. As described above, when the RLC peer entities lose synchronization or another suitable error condition exists, an RLC reset procedure may be initiated, wherein at least one of the RLC peer entities enters into a RESET_PENDING state. After entering the RESET_PENDING state, in an aspect of the present disclosure, the RNC 1002 may transmit a first flush request 1010 to the first Node B 1004. Optionally, the first Node B 1004 may respond with a first flush confirmation signal 1012. Further, the RNC 1002 may transmit a second flush request 1014 to the second Node B 1006. Optionally, the second Node B 1006 may respond with a second flush confirmation signal 1016. Of course, in some examples within the scope of the present disclosure, the flush requests 1010 and 1014 transmitted to each of the Node Bs 1004 and 1006 may be provided in the reverse order or concurrently. Similarly, in some examples within the scope of the present disclosure, the flush confirmation signals 1012 and 1016 may be transmitted from their respective Node B to the RNC 1002 in any order, not necessarily in the illustrated sequence, or concurrently. The RNC 1002 may then transmit an RLC Reset PDU 1018 to the primary serving cell, which in this case corresponds to the first Node B 1004. The first Node B 1004 may then transmit a corresponding RLC Reset PDU 1020 to the UE 1008, which may accordingly perform a suitable reset procedure and respond to the RNC 1002 by transmitting a reset acknowledgment 1022 to the RNC 1002 to indicate that the RLC reset procedure is complete. The RNC 1002 may then move into the RLC state DATA_TRANSFER_READY, as above.

As discussed above, the flush confirmation signaling 1012 and 1016 is optional. That is, in some aspects of the disclosure, the flush confirmation may be explicit signaling provided from the respective Node B to the RNC 1002 (e.g., utilizing the Iub interface or any other suitable means for communication between the Node B and the RNC). Further, the message format may be any suitable format capable of indicating to the RNC that a flushing of one or more buffers corresponding to the RLC flow has been or will be completed. In other aspects of the disclosure, the flush confirmation may be implicit and may not include the explicit flush confirmation signal responses 1012 and 1016 from the Node Bs to the RNC 1002. For example, the RNC 1002 may include a timer configured to measure a known time for a deterministic flush procedure at each of the Node Bs 1004 and 1006. In this case, after the corresponding time has elapsed, the RNC 1002 may implicitly determine that the flush has been completed at the Node B. In another example, the first RLC Reset PDU 1018 may be transmitted to the first Node B 1004 without foreknowledge that the flush procedure has been completed at each of the Node Bs. Here, the first Node B 1004 corresponding to the primary serving cell may wait until it has knowledge that the flush procedure has been completed at each of the plurality of Node Bs 1004, and 1006 prior to sending the second RLC Reset PDU 1020 to the UE 1008. In this example, the determination by the first Node B 1004 that the flush procedure has completed at a disparate Node B, such as the second Node B 1006, may be accomplished utilizing any suitable interface, such as through the RNC 1002, through the UE 1008, or through a direct communication interface. For example, in an example utilizing E-UTRA (LTE), an X2 interface between respective eNode Bs may be utilized. Of course, other examples are possible within the scope of the present disclosure, which enable the reset to complete only after the flush procedure has been completed at each of the Node Bs.

Figure 11:
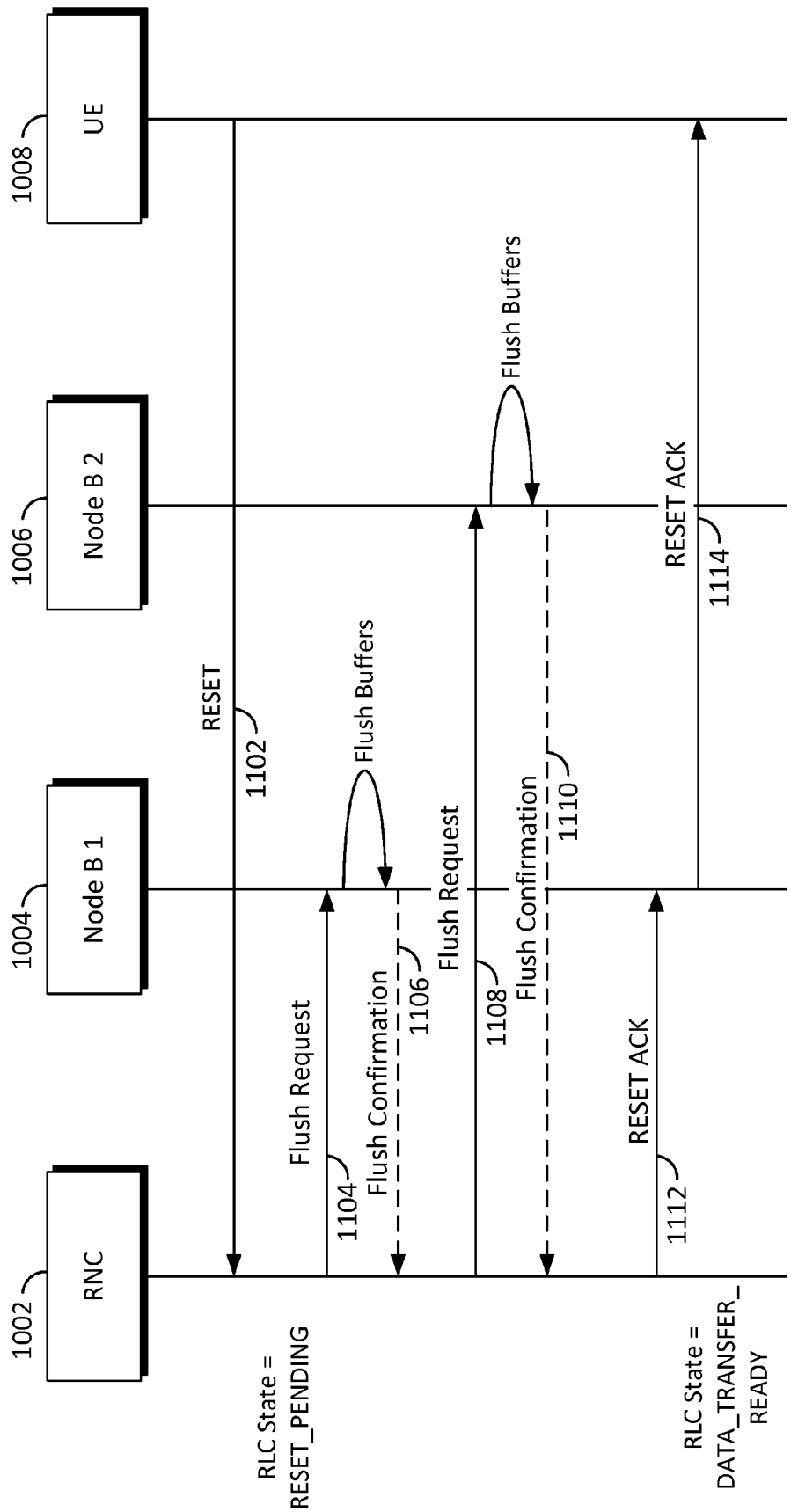
FIG. 11 is a call flow diagram illustrating an RLC reset procedure tailored for the multipoint HSDPA network, where the reset is initiated at the UE.

FIG. 11 is a simplified call flow diagram illustrating an example of an RLC reset procedure in accordance with an aspect of the present disclosure, wherein the RLC reset is initiated at the RLC entity located at the UE 1008. In the illustration, the system may be the same SF-DC HSDPA system illustrated in FIG. 10. In the illustrated example, the UE 1008 may initiate the RLC reset procedure by providing an RLC Reset PDU 1102 to the RNC 1002, in response to which the RNC 1002 may enter a RESET_PENDING state. As described above, the RNC 1002 may then transmit flush requests 1104 and 1108 to each of the Node Bs 1004 and 1006, respectively, and may receive optional explicit confirmation signaling 1106 and 1110, as described above. Also as described above, confirmation that the flush has completed at the respective Node Bs may be implicit rather than signaled utilizing explicit signaling. After the flushing of the respective Node Bs is confirmed, the RNC 1002 may send a reset acknowledgment signal 1112 to the first Node B 1004 corresponding to the primary serving cell, which may then transmit a corresponding reset acknowledgment signal 1114 to the UE 1008.

Figure 12:
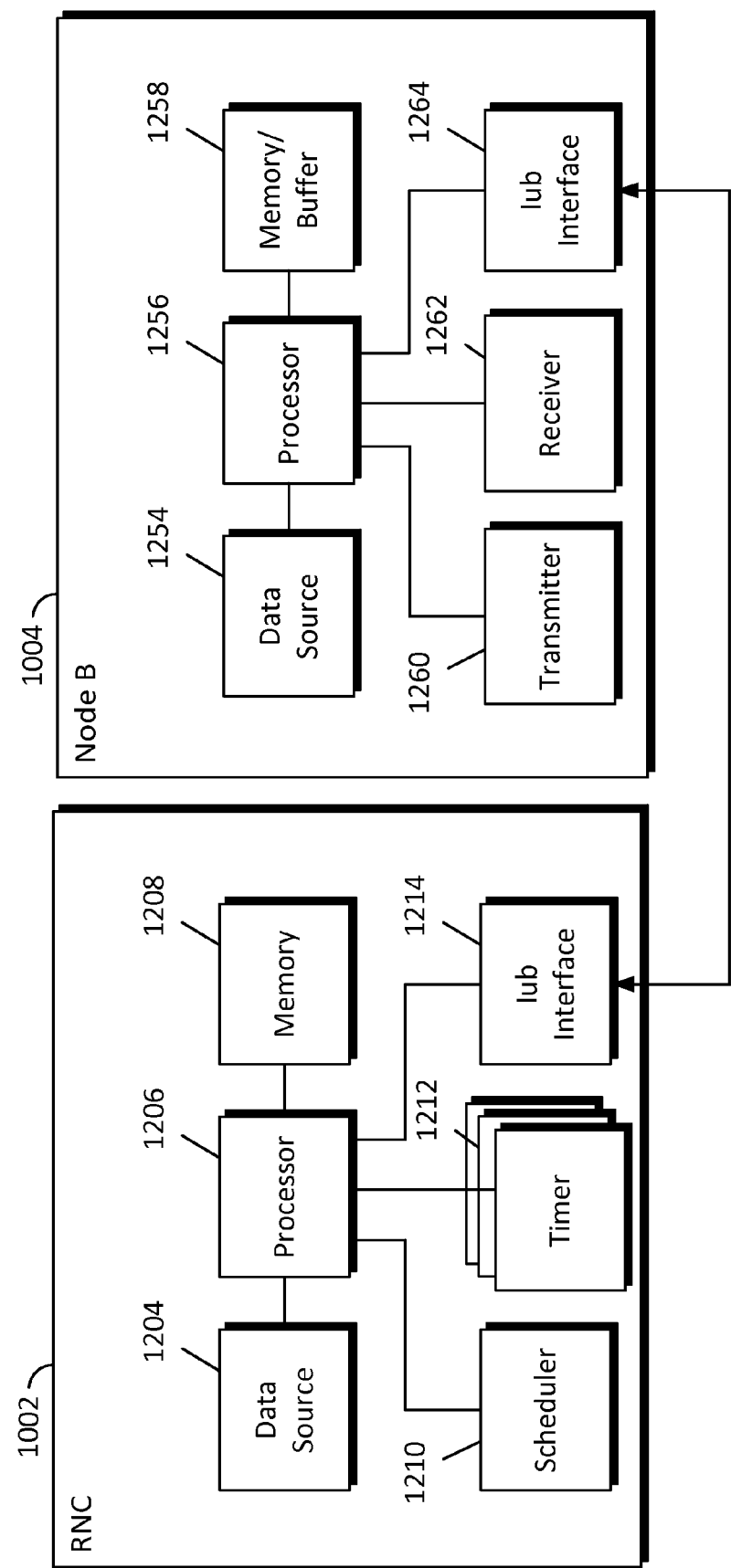
FIG. 12 is a block diagram illustrating an RNC in communication with a Node B in a multipoint HSDPA network.

FIG. 12 is a block diagram of an RNC 1002 in communication with a Node B 1004 in accordance with some aspects of the present disclosure. Here, the RNC 1002 may be configured for a multipoint HSDPA system such as the SF-DC HSDPA system described in the present disclosure. Similarly, the Node B 1004 may be a base station configured for use in a multipoint HSDPA system such as the SF-DC HSDPA system. Further, the Node B 1004 may perform as a primary serving cell or a secondary serving cell in accordance with any number of factors such as measurements by a UE and/or signaling provided by the RNC 1002 or any other suitable node in the system.

The RNC 1002 may include a controller/processor 1206 for controlling various components in the RNC 1002 and processing information. The processor 1206 may be used to direct the operation at the RNC 1002. For example, the processor 1206 may provide various functions including timing, peripheral interfaces, voltage regulation, power management, and other control functions. The processor 1206 may be coupled to a data source 1204, a memory 1208, a scheduler 1210, one or more timers 1212, and an Iub interface 1214.

Here, the data source 1204 may be an interface to a core network or any other suitable node for providing data to the RNC 1002. The memory 1208 may be any suitable memory for temporarily or permanently storing information relating to the RNC 1002 and may generally be any suitable computer-readable medium. The computer readable media of memory 1208 may store data and software for the RNC 1002. The scheduler 1210 may be integrated or separate from the processor 1206 and may be utilized for allocating packets of an RLC flow to one or more Node Bs in the multipoint HSDPA system. The Iub interface 1214 is one example of a backhaul interface that may be utilized for communication between the RNC 1002 and one or more Node Bs 1004. In some examples, a plurality of Iub interfaces may be included in the RNC 1002. In an example wherein an implicit determination that the flushing has been completed is utilized, the one or more timers 1212 may be utilized for determining that a suitable time has elapsed for the flushing of buffers in the Node B.

The Node B 1004 may include a controller/processor 1256 for controlling various components in the Node B 1004 and processing information. The processor 1256 may be used to direct the operation at the Node B 1004. For example, the processor 1256 may provide various functions including timing, peripheral interfaces, voltage regulation, power management, and other control functions. The processor 1256 may be coupled to a data source 1254, a memory/buffer 1258, a transmitter 1260, a receiver 1262, and an Iub interface 1264. Here, the data source may be the same as the Iub interface 1264 or may be any suitable interface or internal source of data for transmitting to a UE. The memory/buffer may be any suitable memory for temporarily or permanently storing information relating to the Node B 1004 and may generally be any suitable computer-readable medium. The computer readable media of memory 1258 may store data and software for the Node B 1004. Further, the memory/buffer 1258 may include one or more buffers for buffering RLC PDUs corresponding to an RLC flow between the RNC 1002 and a UE. The transmitter 1260 and the receiver 1262 may be utilized for communication with one or more UEs over any suitable wireless air interface, for example, utilizing UTRAN communication standards. The Iub interface 1264 is one example of a backhaul interface that may be utilized for communication between the Node B 1004 and the RNC 1002.

Figure 13:
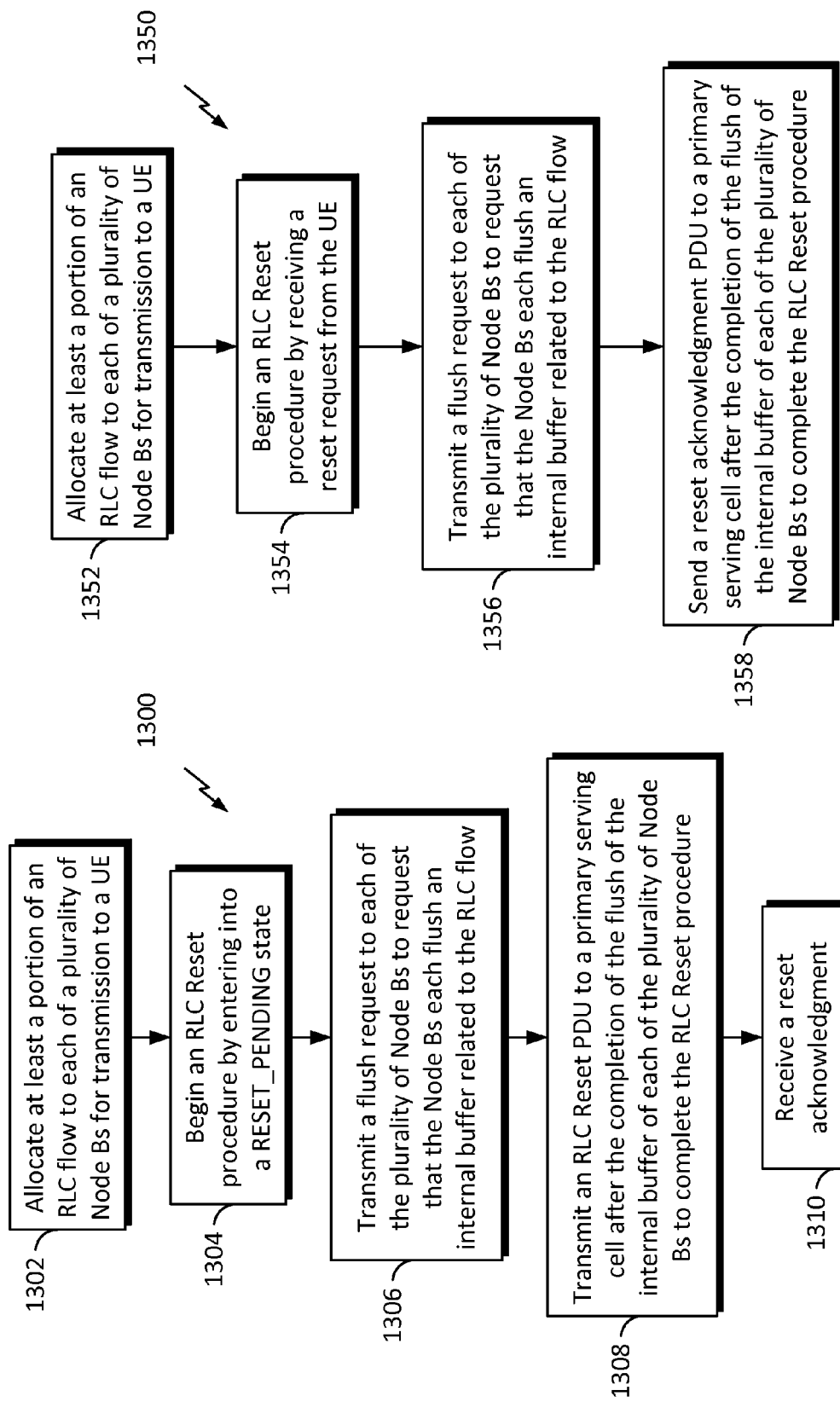
FIG. 13 includes flow charts illustrating exemplary processes for an RLC reset operable at an RNC.

FIG. 13 is a flow chart illustrating exemplary processes 1300 and 1350 operable at an RNC for an RLC reset in accordance with some aspects of the present disclosure. In some examples, the processes 1300 and 1350 may be implemented by the RNC 1002 illustrated in FIGS. 10-12. In some examples, the processes 1300 and 1350 may be implemented by the processing system 114 illustrated in FIG. 1, or by any suitable means for performing the described functions. Here, process 1300 corresponds to an RLC reset procedure initiated by the RNC while process 1350 corresponds to an RLC reset procedure initiated by the UE.

In block 1302, the RNC 1002 may allocate at least a portion of an RLC flow to each of a plurality of Node Bs for transmission to a UE. For example, the scheduler 1210 may break an RLC flow into a plurality of subflows such that the subflows are provided to each of the plurality of Node Bs (e.g., utilizing the Iub interface 1214). In block 1304, based on any suitable error condition such as a loss of synchronization between peer RLC entities, the RNC 1002 may begin an RLC reset procedure by entering into an RLC RESET_PENDING state.

In block 1306, during the RLC reset procedure, the RNC 1002 may transmit a flush request to each of the plurality of Node Bs, to request that the Node Bs each flush an internal buffer related to the RLC flow. For example, the Node Bs may be requested to flush all internal buffers related to the RLC flow. Optionally, in block 1306 the RNC 1006 may additionally receive an explicit flush confirmation from each of the base stations to confirm that the flush of the internal buffer related to the RLC flow is complete. In another example, rather than receiving the explicit flush confirmation, the RNC 1006 may determine that the flush of the internal buffer related to the RLC flow is complete in accordance with the elapsing of a predetermined time after the transmitting of the flush request. Here, the predetermined time may be measured by utilizing one or more timers 1212 corresponding to the respective Node Bs. In block 1308, the RNC 1002 may send a reset request (e.g., an RLC Reset PDU) to a primary serving cell after the completion of the flush of the internal buffer of each of the plurality of Node Bs in order to complete the RLC reset procedure. In block 1310, the RNC 1002 may receive a reset acknowledgment from the UE indicating that the UE has received the RLC Reset PDU and accordingly completed its own reset procedure.

Process 1350, while operable at the RNC 1002, provides an RLC reset procedure initiated by the UE. That is, in block 1352, the RNC 1002 may allocate at least a portion of an RLC flow to each of a plurality of Node Bs for transmission to the UE. In block 1354, the RNC 1002 may begin an RLC reset procedure by receiving a reset request (e.g., an RLC Reset PDU) from the UE.

In block 1356, the RNC 1002 may transmit a flush request to each of the plurality of Node Bs to request that the Node Bs each flush an internal buffer related to the RLC flow. For example, the Node Bs may be requested to flush all internal buffers related to the RLC flow. Optionally, in block 1356, the RNC 1006 may additionally receive an explicit flush confirmation from each of the base stations to confirm that the flush of the internal buffer related to the RLC flow is complete. In another example, rather than receiving the explicit flush confirmation, the RNC 1006 may determine that the flush of the internal buffer related to the RLC flow is complete in accordance with the elapsing of a predetermined time after the transmitting of the flush request. Here, the predetermined time may be measured by utilizing one or more timers 1212 corresponding to the respective Node Bs. In block 1358, the RNC 1002 may send a reset acknowledgment PDU to a primary serving cell after the completion of the flush of the internal buffer of each of the plurality of Node Bs in order to complete the RLC reset procedure. Here, the reset acknowledgment PDU may be forwarded from the primary serving cell to the UE to inform the UE that the RLC reset procedure is complete.

Figure 14:
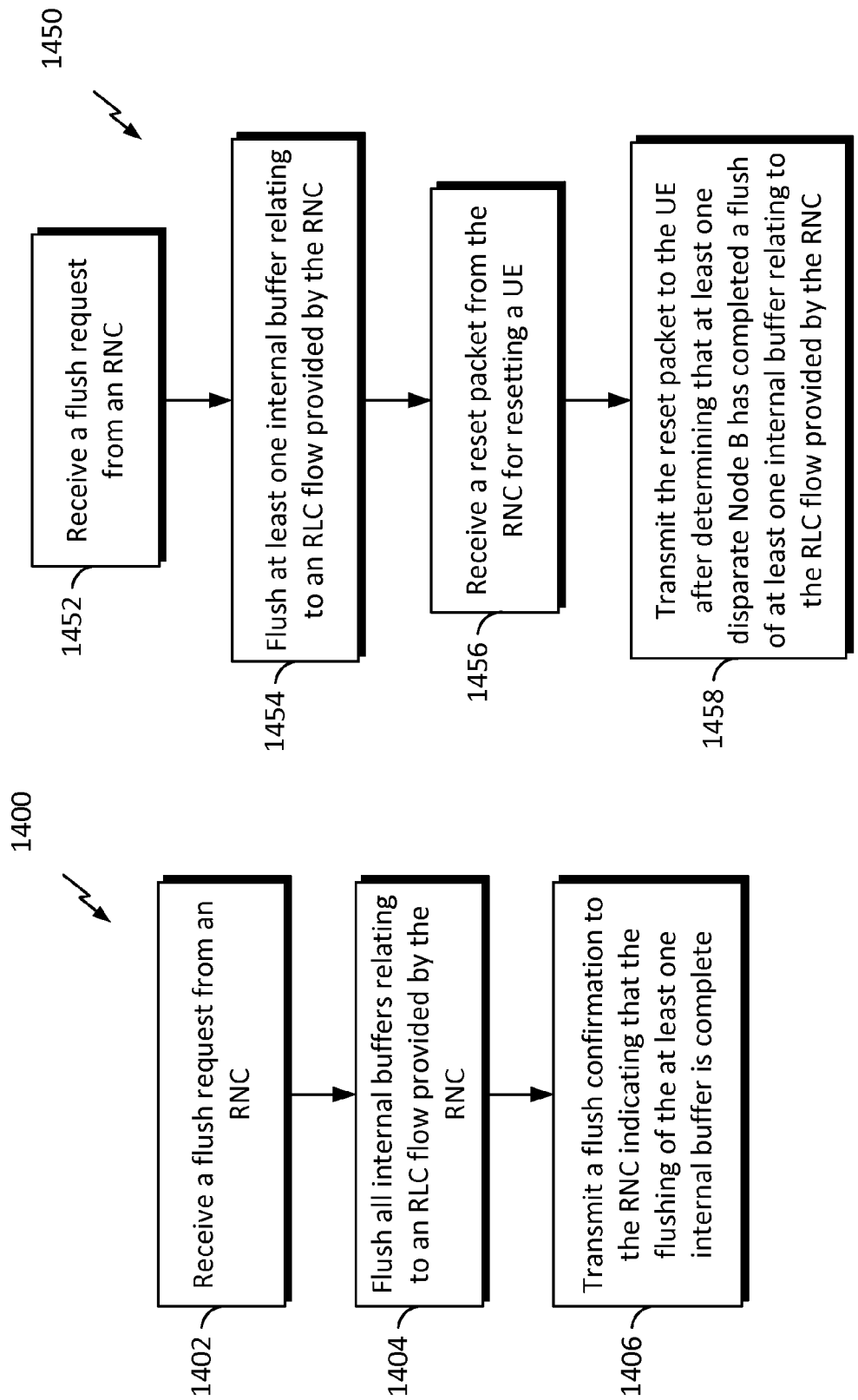
FIG. 14 includes flow charts illustrating exemplary processes for an RLC reset operable at a Node B.

FIG. 14 is a flow chart illustrating exemplary processes 1400 and 1450 operable at a Node B during an RLC reset in accordance with some aspects of the present disclosure. In some examples, the processes 1400 and 1450 may be implemented by the Node B 1004 illustrated in FIGS. 10-12. In some examples, the processes 1400 and 1450 may be implemented by the processing system 114 illustrated in FIG. 1 or by any suitable means for performing the described functions. Here, the process 1400 corresponds to the transmission of an explicit flush confirmation to the RNC 1002 while process 1450 corresponds to an implicit flush confirmation.

In block 1402, the Node B 1004 may receive a flush request from an RNC. Here, the flush request may be received utilizing the Iub interface 1264. Responsive to the received flush request, the Node B 1004 may flush all internal buffers 1258 relating to an RLC flow provided by the RNC. That is, the Node B 1004 may be one of a plurality of serving cells being utilized by the RNC to transmit an RLC flow to a UE in a multipoint HSDPA system. As a part of an RLC reset procedure, in block 1404, the RNC 1004 may clean out all queued packets relating to the RLC flow. In block 1406, the Node B 1004 may transmit a flush confirmation to the RNC indicating that the flushing of the internal buffers 1258 is complete.

Process 1450 corresponds to a procedure for a Node B 1004 wherein an implicit indication that a flush has been completed is utilized in a multipoint HSDPA system. In block 1452, the Node B 1004 may receive a flush request from an RNC (e.g., over the Iub interface 1264). In block 1454, the Node B 1004 may flush at least one internal buffer relating to the RLC flow provided by the RNC. In block 1456, the Node B 1004 may receive a reset packet from the RNC (e.g., an RLC Reset PDU or an RLC Reset Acknowledgment PDU, depending on whether the RLC reset procedure is initiated at the RNC or at the UE, respectively) for resetting the UE. In block 1458, the Node B 1004 may transmit the received reset packet to the UE after determining that at least one disparate base station has completed a flush of at least one internal buffer relating to the RLC flow provided by the RNC. That is, the Node B 1004 may retain the received reset packet until such a time that it can confirm that the flushing of the buffers relating to the RLC flow has been completed at each Node B being utilized in the multipoint HSDPA system for that RLC flow. Here, the confirmation that the flushing of the internal buffers at the disparate base stations may be accomplished utilizing any one or more of the transmitter 1260, the receiver 1262, the Iub interface 1264, the data source 1254, or any suitable means for confirming that the flushing of the disparate Node Bs' internal buffers has been completed.

Several aspects of a telecommunications system have been presented with reference to a W-CDMA system. As those skilled in the art will readily appreciate, various aspects described throughout this disclosure may be extended to other telecommunication systems, network architectures, and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one," unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
    allocating at least a portion of an RLC flow to each of a plurality of base stations for transmission to a user equipment;
    beginning an RLC reset procedure to reset the RLC flow;
    transmitting a flush request to each of the plurality of base stations to request that the base stations each flush an internal buffer related to the RLC flow;
    completing the RLC reset procedure after completion of the flush of the internal buffer of the each of the plurality of base stations, and
    facilitating a determination at a first base station that a second base station has completed the flush of its internal buffer, among the plurality of base stations,
    wherein the completing of the RLC reset procedure comprises transmitting a reset request to at least one base station of the plurality of base stations.

2. The method of claim 1, wherein the beginning of the RLC reset procedure comprises entering into a reset pending state.

3. The method of claim 1, wherein the at least one base station corresponds to a primary serving cell.

4. The method of claim 1, wherein the completing of the RLC reset procedure further comprises receiving a reset acknowledgment from the user equipment.

5. The method of claim 1, wherein the beginning of the RLC reset procedure comprises receiving a reset request from the user equipment.

6. The method of claim 5, wherein the completing of the RLC reset procedure comprises transmitting a reset acknowledgment to at least one base station of the plurality of base stations.

7. The method of claim 6, wherein the at least one base station corresponds to a primary serving cell.

8. The method of claim 1, further comprising receiving an explicit flush confirmation from the each of the plurality of base stations to confirm that the flush of the respective internal buffer related to the RLC flow is complete.

9. The method of claim 1, further comprising, for each of the plurality of base stations:
    determining that a predetermined time has elapsed after the transmitting of the respective flush request; and
    determining that the flush of the respective internal buffer related to the RLC flow is complete in accordance with the elapsing of the predetermined time.

10. A method of wireless communication operable at a base station, comprising:
- receiving a flush request from a radio network controller (RNC);
- flushing all internal buffers relating to an RLC flow provided by the RNC;
- transmitting a flush confirmation to the RNC indicating that the flushing of all the internal buffers relating to the RLC flow is complete;
- receiving knowledge via the RNC that a disparate base station has completed a flush of an internal buffer relating to the RLC flow; and
- after transmitting the flush confirmation, receiving a reset request from the RNC.

11. A method of wireless communication operable at a base station, comprising:
- receiving a flush request from a radio network controller (RNC);
- flushing at least one internal buffer relating to an RLC flow provided by the RNC;
- receiving a reset packet from the RNC for resetting a user equipment; and
- transmitting the reset packet to the user equipment after receiving knowledge via the RNC that at least one disparate base station has completed a flush of at least one internal buffer relating to the RLC flow provided by the RNC.

12. The method of claim 11, wherein the reset packet comprises at least one of an RLC Reset PDU or an RLC Reset Acknowledgment PDU.

13. An apparatus configured for wireless communication, comprising:
- at least one processor;
- a communication interface coupled to the at least one processor for transmitting information to a plurality of base stations; and
- a memory coupled to the at least one processor,
- wherein the at least one processor is configured to:
  - allocate at least a portion of an RLC flow to each of the plurality of base stations for transmission to a user equipment;
  - begin an RLC reset procedure to reset the RLC flow;
  - transmit a flush request to each of the plurality of base stations to request that the base stations each flush an internal buffer related to the RLC flow;
  - complete the RLC reset procedure after completion of the flush of the internal buffer of the each of the plurality of base stations, and
  - facilitate a determination at a first base station that a second base station has completed the flush of its internal buffer, among the plurality of base stations,
  - wherein the completing of the RLC reset procedure comprises transmitting a reset request to at least one base station of the plurality of base stations.

14. The apparatus of claim 13, wherein the beginning of the RLC reset procedure comprises entering into a reset pending state.

15. The apparatus of claim 13, wherein the at least one base station corresponds to a primary serving cell.

16. The apparatus of claim 13, wherein the completing of the RLC reset procedure further comprises receiving, over the communication interface, a reset acknowledgment from the user equipment.

17. The apparatus of claim 13, wherein the beginning of the RLC reset procedure comprises receiving a reset request from the user equipment.

18. The apparatus of claim 17, wherein the completing of the RLC reset procedure comprises transmitting a reset acknowledgment to at least one base station of the plurality of base stations.

19. The apparatus of claim 18, wherein the at least one base station corresponds to a primary serving cell.

20. The apparatus of claim 13, wherein the at least one processor is further configured to receive, over the communication interface, an explicit flush confirmation from the each of the plurality of base stations to confirm that the flush of the respective internal buffer related to the RLC flow is complete.

21. The apparatus of claim 13, further comprising, for each of the plurality of base stations, a timer for determining that a predetermined time has elapsed after the transmitting of the respective flush request, to complete the RLC reset procedure,
- wherein the at least one processor is further configured to determine that the flush of the respective internal buffer related to the RLC flow is complete in accordance with the elapsing of the predetermined time.

22. A base station configured for wireless communication, comprising:
- at least one processor;
- a memory coupled to the at least one processor; and
- a communication interface coupled to the at least one processor for transmitting information to a radio network controller (RNC),
- wherein the at least one processor is configured to:
- receive a flush request from the RNC;
- flush all internal buffers relating to an RLC flow provided by the RNC;
- transmit a flush confirmation to the RNC indicating that the flushing of all the internal buffers relating to the RLC flow is complete;
- receiving knowledge via the RNC that a disparate base station has completed a flush of an internal buffer relating to the RLC flow; and
- receive a reset request from the RNC after transmitting the flush confirmation.

23. A base station configured for wireless communication, comprising:
- at least one processor;
- a memory coupled to the at least one processor;
- a communication interface coupled to the at least one processor for transmitting information to a radio network controller (RNC); and
- a transmitter coupled to the at least one processor for transmitting information to a user equipment,
- wherein the at least one processor is configured to:
- receive a flush request from the RNC;
- flush at least one internal buffer relating to an RLC flow provided by the RNC;
- receive a reset packet from the RNC for resetting the user equipment; and
- transmit the reset packet to the user equipment after receiving knowledge via the RNC that at least one disparate base station has completed a flush of at least one internal buffer relating to the RLC flow provided by the RNC.

24. The base station of claim 23, wherein the reset packet comprises at least one of an RLC Reset PDU or an RLC Reset Acknowledgment PDU.

25. An apparatus for wireless communication, comprising:
- means for allocating at least a portion of an RLC flow to each of a plurality of base stations for transmission to a user equipment;

means for beginning an RLC reset procedure to reset the RLC flow;
means for transmitting a flush request to each of the plurality of base stations to request that the base stations each flush an internal buffer related to the RLC flow;
means for completing the RLC reset procedure after completion of the flush of the internal buffer of the each of the plurality of base stations,
means for facilitating a determination at a first base station that a second base station has completed the flush of its internal buffer, among the plurality of base stations,
wherein the RLC reset procedure is completed at least in part by the transmission of a reset request to at least one base station of the plurality of base stations.

26. A base station configured for wireless communication, comprising:
means for receiving a flush request from a radio network controller (RNC);
means for flushing all internal buffers relating to an RLC flow provided by the RNC;
means for transmitting a flush confirmation to the RNC indicating that the flushing of all the internal buffers relating to the RLC flow is complete;
means for receiving knowledge via the RNC that a disparate base station has completed a flush of an internal buffer relating to the RLC flow; and
means for after transmitting the flush confirmation, receiving a reset request from the RNC.

27. A base station configured for wireless communication, comprising:
means for receiving a flush request from a radio network controller (RNC);
means for flushing at least one internal buffer relating to an RLC flow provided by the RNC;
means for receiving a reset packet from the RNC for resetting a user equipment; and
means for transmitting the reset packet to the user equipment after receiving knowledge via the RNC that at least one disparate base station has completed a flush of at least one internal buffer relating to the RLC flow provided by the RNC.

28. A computer program product, comprising:
a non-transitory computer readable medium comprising:
instructions for causing a radio network controller (RNC) to allocate at least a portion of an RLC flow to each of a plurality of base stations for transmission to a user equipment;
instructions for causing the RNC to begin an RLC reset procedure to reset the RLC flow;
instructions for causing the RNC to transmit a flush request to each of the plurality of base stations to request that the base stations each flush an internal buffer related to the RLC flow; and
instructions for causing the RNC to complete the RLC reset procedure after completion of the flush of the internal buffer of the each of the plurality of base stations,
instructions for causing the RNC to facilitate a determination at a first base station that a second base station has completed the flush of its internal buffer, among the plurality of base stations,
wherein the completing of the RLC reset procedure comprises transmitting a reset request to at least one base station of the plurality of base stations.

29. A computer program product, comprising:
a non-transitory computer readable medium comprising:
instructions for causing a base station to receive a flush request from a radio network controller (RNC);
instructions for causing the base station to flush all internal buffers relating to an RLC flow provided by the RNC; and
instructions for causing the base station to transmit a flush confirmation to the RNC indicating that the flushing of all the internal buffers relating to the RLC flow is complete;
instructions for causing the base station to receive knowledge via the RNC that a disparate base station has completed a flush of an internal buffer relating to the RLC flow; and
instructions for causing the base station to receive a reset request from the RNC after transmitting the flush confirmation.

30. A computer program product, comprising:
a non-transitory computer readable medium comprising:
instructions for causing a base station to receive a flush request from a radio network controller (RNC);
instructions for causing the base station to flush at least one internal buffer relating to an RLC flow provided by the RNC;
instructions for causing the base station to receive a reset packet from the RNC for resetting a user equipment; and
instructions for causing the base station to transmit the reset packet to the user equipment after receiving knowledge via the RNC that at least one disparate base station has completed a flush of at least one internal buffer relating to the RLC flow provided by the RNC.

* * * * *